United States Patent [19]

Fisher et al.

[11] Patent Number: 4,463,392

[45] Date of Patent: Jul. 31, 1984

[54] RECORDING SYSTEM WITH NOISE REDUCTION

[76] Inventors: Charles B. Fisher, 2850 Hill Park Rd., Montreal, Quebec H3H 1T1; Sidney T. Fisher, 53 Morrison Ave., Montreal, Quebec H3R 1K3, both of Canada

[21] Appl. No.: 253,204

[22] Filed: Apr. 13, 1981

[51] Int. Cl.³ .............................................. G11B 5/04
[52] U.S. Cl. ........................................ 360/30; 360/29
[58] Field of Search ...................... 360/27, 28, 29, 30

[56] References Cited

U.S. PATENT DOCUMENTS

| | | | |
|---|---|---|---|
| 2,807,797 | 9/1957 | Shoemaker | 360/28 |
| 3,012,234 | 12/1961 | Burns | 360/29 |
| 3,405,232 | 10/1968 | Morrow et al. | 360/29 |
| 4,148,078 | 4/1979 | Riddle, Jr. | 360/27 |

OTHER PUBLICATIONS

Reference Data for Radio Engineers, New York 1969 pp. 21-13 and 21-14.
"Modulation, Noise & Spectral Analysis"-P. F. Panter, McGraw Hill 1965 pp. 524-527.
"Zero-Crossing Detector Provides Fast Sync Pulses", Prigozy, Electronics 4/19/65 p. 91.
"Transmission System for Communications", Bell Telephone Labortories 1971, pp. 125-128.
"Modulation Theory"-M. S. Black, New York 1953 pp. 48, 57 and 103.
"Information, Transmission, Modulation, & Noise'-'-Schwartz, McGraw Hill Book Co., p. 91.

Primary Examiner—Vincent P. Canney

[57] ABSTRACT

Recording apparatus which receives a signal, double-sideband amplitude modulates a carrier with at least three times the highest carrier frequency, with the signal, and records the modulated carrier on a recording medium. The reproducing apparatus reproduces the signal modulated carrier substantially free from superimposed noise and delivers it to an external circuit, where it may be recorded or may be demodulated and the signal recorded.

9 Claims, 3 Drawing Figures

RECORDING SYSTEM WITH NOISE REDUCTION

BACKGROUND OF THE INVENTION

This invention discloses apparatus for analog recording and reproduction of a signal, substantially free from superimposed noise from the recording medium and the recording and reproducing apparatus.

In recording systems it is frequently necessary to record, reproduce and re-record a signal several times. In analog systems of the prior art noise from the recording medium and the recording and reproducing apparatus is superimposed on the signal at each recording and reproduction stage, and degrades the quality of the signal. In this invention the superimposed noise is substantially reduced by sampling and reconstruction means.

BRIEF DESCRIPTION OF THE INVENTION

This invention discloses an analog recording system in which a signal is modulated on a carrier, recorded and reproduced one or more times, with substantial reduction of noise superimposed on the signal modulated carrier by imperfections in the recording medium and the recording and reproducing apparatus.

The recording apparatus generates a carrier, which is double-sideband amplitude modulated by the signal, and the signal modulated carrier is recorded on a suitable medium, in a first stage. In a second stage the modulated carrier is reproduced from the recording medium, and the signal modulated carrier plus superimposed noise as reproduced is sampled to produce a first sequence of short samples, at approximate instants of peaks of alternate polarity of the carrier at the sampling device, with a sampling frequency greater than the minimum sampling frequency of the signal modulated carrier. The signal modulated carrier plus superimposed noise is also sampled to produce a second sequence of short samples, at approximate instants of zero-crossings of the carrier at the sampling device, with the same sampling frequency as the first sequence.

The two sample sequences are delivered with opposite polarities to a band-pass filter with a pass-band equal to the signal modulated carrier frequency band, which reconstructs the sequences of samples in analog form so that the noise components in each sequence cancel one another, and which delivers the carrier modulated by the signal substantially free from noise. The signal modulated carrier may be recorded, may be demodulated and the resultant signal recorded, or may be transmitted to an external circuit. The frequency of the gating pulses required to produce the sample sequences is derived from the recording of the signal modulated carrier, and the required timing is provided by gating pulse delay circuits.

The first and second stages may be repeated in tandem as often as necessary, without superimposing increased recording or apparatus noise on the signal modulated carrier.

DETAILED DESCRIPTION OF THE INVENTION

Figure 1:
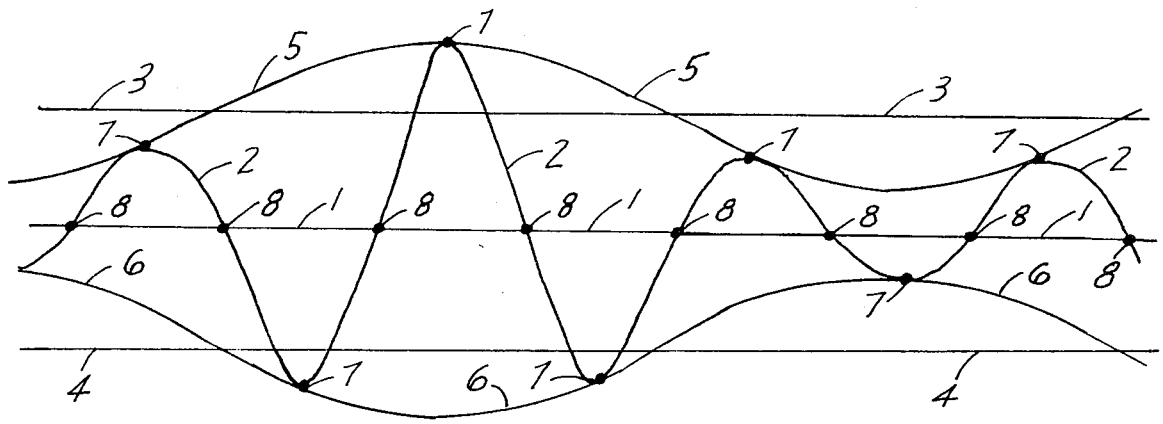
FIG. 1 shows waveforms and sampling instants in apparatus according to the invention.

This invention is based on the following theorems:

(a) A band-limited wave extending in frequency from $(n-1)B$ to $nB$, where n is a positive number equal to or greater than unity, and B is the bandwidth of the band-limited wave, is fully defined by a sequence of samples taken at a frequency greater than the Nyquist frequency for the wave, unless all samples are taken at instants of zero-crossings of the wave. This Nyquist frequency is a function with discontinuous derivatives, having a value of 2B for all values of n equal to or less than 2, for all integral values of n, and values between 2B and 4B for non-integral values of n greater than 2, the Nyquist frequency approaching 2B for non-integral values of n as n increases to a large number. The Nyquist or minimum sampling frequency is stated mathematically, and is plotted, in Reference Data for Radio Enginers, New York 1969, page 21–14, for a band-limited wave with bandwidth B, with the lowest frequency in the band in the range of zero to 6B. When the wave is an amplitude-modualted carrier, the minimum sampling frequency which fully defines the wave is one-half the Nyquist frequency, as shown in U.S. Pat. No. 4,178,553.

(b) A sequence of samples at regular intervals which fully defines a band-limited wave is reconstructed as a replica of that wave, when passed through a filter having a pass-band the same as the frequency band of the band-limited wave, with change of amplitude but no change of waveform, except that due to the reconstruction filter characteristics.

(c) The reconstruction of the sampled band-limited wave is entirely unaffected by the particular instants at which samples are taken, so long as they are taken at a constant frequency which is adequately high. Thus advancing or delaying the sampling instants need not advance, delay or otherwise affect the reconstructed wave.

(d) A carrier double-sideband amplitude modulated by a signal has zero-crossings at the same instants as the zero-crossings of the unmodulated carrier, and has peaks at approximately the same instants as the peaks of the unmodulated carrier.

In this invention a signal to be recorded amplitude modulates a constant frequency, constant amplitude carrier, producing a double-sideband amplitude modulated carrier. The signal modulated carrier is recorded on a recording medium, and reproduced from the recording medium, in general with noise superimposing on the signal modulated carrier. The signal modulated carrier plus noise is then sampled to produce a first sequence of short samples, at instants of alternate positive and negative peaks of the carrier, and the samples are reconstructed in a band-pass filter with the pass-band of the modulated carrier, which reconstructs a first analog replica of the noise, and of the signal modulated carrier. This filter obeys the principle of superposition. The signal modulated carrier plus noise is then sampled to produce a second sequence of short samples at zero-crossings of the carrier, at the same frequency as the first sequence. The second sequence, in which the samples do not overlap the samples of the first sequence in time, is reversed in polarity and reconstructed in the same filter as the first sequence of samples, without multiplicative interaction between the two sequences of samples. The reconstruction of the second sequence produces a second reversed analog replica of the noise, which cancels the first analog replica of the noise, and the signal modulated carrier is delivered substantially free from noise.

In practice the sampling frequency need not be precise, state-of-the-art sampling gates are fully adequate, and the design and construction of the filter may be conventional, thus a large reduction in superimposed noise is readily obtained. The signal modulated carrier may be repeatedly recorded and reproduced by similar means without superposition of substantial noise, or may be demodulated to recover the signal.

In FIG. 1 a time base, line 1, has erected on it a carrier with a frequency of 45 kHz, with unmodulated peak amplitudes at lines 3 and 4. Carrier 2 is modulated to a depth of 67% by a 15-kHz sine-wave signal as the modulated wave of line 2. The locus of the positive peaks of modulated carrier 2 is line 5, which is also the waveform of the signal. The locus of the negative peaks of modulated carrier 2 is line 6.

When sampled at alternate positive and negative peaks of the unmodulated carrier the sampling points occur at locations designated 7.

Figure 2:
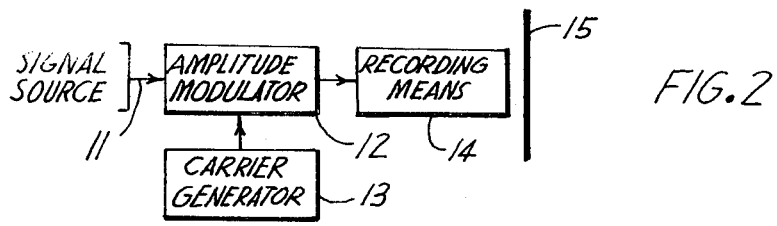
FIG. 2 shows a simplified block schematic circuit diagram of recording apparatus according to the invention.

FIG. 2 shows a simplified block schematic circuit diagram of recording apparatus according to the invention. A signal to be recorded is received on lead 11, and double-sideband amplitude modulates a sine-wave carrier from carrier generator 13, in modulator 12, which may be of a type which suppresses the signal at its output. Carrier generator 13 generates a carrier having a frequency equal to or greater than three times the highest frequency of the signal to be recorded.

The output of modulator 12 is delivered to recording means 14, if necessary through a filter not shown, which passes the modulated carrier but stops the signal, which records the output on recording medium 15. Recording means 14 and recording medium 15 may be types using magnetic tape or other suitable recording means and media.

Figure 3:
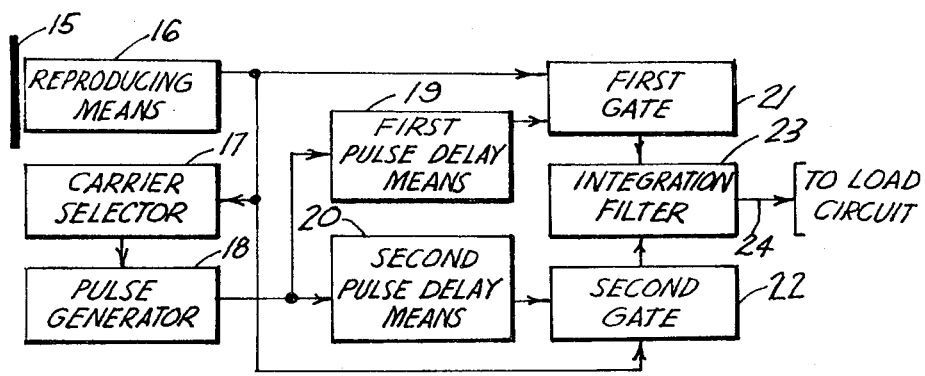
FIG. 3 shows a simplified block schematic circuit diagram of reproducing apparatus according to the invention.

FIG. 3 shows a simplified block schematic circuit diagram of reproducing apparatus according to the invention. A recording medium 15 which has been recorded with a signal modulated sine-wave carrier, actuates reproducing means 16, which delivers an electric wave which is a faithful reproduction of the recording on medium 15, plus superimposed noise caused by imperfections in the recording medium and the recording and reproducing apparatus.

The output of reproducing means 16 is delivered to carrier selector 17, first sampling gate 21 and second sampling gate 22. Carrier selector 17 selects the carrier from the signal modulated carrier plus noise delivered by reproducing means 16, by at least one of selectivity, amplitude limiting and oscillator synchronizing means, substantially free from sidebands and noise. Carrier selector 17 delivers the carrier to pulse generator 18, which generates a sequence of short pulses at a frequency equal to the frequency of carrier peaks of alternate polarity.

The output of pulse generator 18 is delivered to pulse delay circuit 19 which delays, passes and delivers a sequence of short pulses to first sampling gate 21 as gating pulses, delayed so that the pulses occur approximately at instants of alternate positive and negative peaks of the carrier at sampling gate 21.

The output of pulse generator 18 is also delivered to pulse delay circuit 20 which delays, passes and delivers a sequence of short pulses to second sampling gate 22 as gating pulses, delayed so that each pulse occurs at an instant of zero-crossing of the carrier at sampling gate 22.

Sampling gates 21 and 22 may be separate gates, or may be combined in a single bipolar gate. It is necessary that the sequence of samples delivered by gates 21 and 22 have opposite polarities. With a bipolar gate performing the functions of gates 21 and 22, or with separate sampling gates of some types, this may be achieved by delivering a sequence of pulses of one polarity from pulse delay circuit 19 and a sequence of pulses of the opposite polarity from pulse delay circuit 20. With separate sampling gates 21 and 22 the output connections from one gate may be reversed from the output connections of the other gate.

Sampling gate 21 delivers a sequence of short samples of a signal modulated carrier plus noise to reconstruction filter 23, which is a band-pass filter with a passband substantially equal to the frequency band of the signal modulated carrier. Reconstruction filter 23 produces an analog replica of the signal modulated carrier, and a first analog replica of the superimposed noise of a first polarity, from the output of sampling gate 21.

Sampling gate 22 delivers a sequence of short samples of substantially the noise only, of a second polarity, to reconstruction filter 23, as the samples have been taken substantially at zero-crossings of the carrier at gate 22, and filter 23 produces a second analog replica of the superimposed noise, of a second polarity, from the output of gate 22.

The first and second noise replicas of opposed polarity are substantially identical in waveform, as required by theorem (c) above, and hence are substantially cancelled, and a signal modulated carrier is delivered by reconstruction filter 23 over lead 24 to the load circuit, substantially free from superimposed noise to the load circuit, substantially free from superimposed noise.

The load circuit may be a recording means which records the signal modulated carrier on a recording medium. In this case FIG. 3 forms an apparatus unit which may be repeated in tandem as often as required, to give the desired number of recordings and reproductions, without substantial amounts of superimposed noise from the recording medium or the apparatus.

The load circuit in FIG. 2 may be an amplitude modulation detector, preferably of the sampling type disclosed in U.S. Pat. No. 4,253,066, class 329/50, for Synchronous Detection With Sampling, issued Feb. 24, 1981 to Fisher et al., and the output of this detector may be used for recording or for sound production. The load circuit may also be an electric transmission circuit.

Since many changes could be made in the above construction and many apparently widely different embodiments of this invention could be made without departing from the scope thereof, it is intended that all matter contained in the above description or shown in the accompanying drawings shall be interpreted as being illustrated only and not limiting.

We claim:

1. Reproducing apparatus, in which reproducing means produces an input wave from an input recording medium, said input wave being a carrier of substantially constant amplitude and substantially constant frequency, with a band-limited signal which amplitude modulates said carrier on a double-sideband basis, together with noise superimposed on said modulated carrier in the frequency band of said modulated carrier, and by sampling means timed from said carrier, and reconstruction means, delivers a carrier modulated by said signal to a load circuit, substantially free from said superimposed noise.

2. Reproducing apparatus in accordance with claim 1, in which said load circuit consists of recording means arranged to record said signal modulated carrier on an output recording medium.

3. Reproducing apparatus in accordance with claim 1, in which said load circuit is an electric transmission circuit arranged to transmit said signal modulated carrier.

4. Reproducing apparatus in accordance with claim 1, in which said load circuit is an amplitude modulation detector.

5. Reproducing apparatus in accordance with claim 1, which comprises:
   reproducing means which reproduces said input wave from an input recording medium, and
   first sampling means which samples said input wave to produce a first sequence of short samples of said input wave, said first sequence of samples occurring substantially at instants of peaks of alternate polarity of said modulated carrier at said first sampling means, and
   second sampling means which samples said input wave to produce a second sequence of short samples of said input wave of a second polarity, with a sampling frequency the same as the sampling frequency of said first sampling means, said second sequence of samples occurring substantially at instants of zero-crossings of said carrier at said second sampling means, and
   reconstruction means which receives said first and said second sample sequences, and includes a bandpass filter with substantially the pass-band of the frequency band of
   the signal modulated carrier, at the output of said sampling gates, which substantially cancels said noise and produces an analog replica of said signal modulated carrier, and
   a load circuit which receives the output of said reconstruction means, and
   a carrier selector which receives the output of said reproducing means and by at least one of selectivity, amplitude limiting and oscillator synchronization produces said carrier substantially free from sidebands and said superimposed noise, and
   a pulse generator which produces a sequence of short pulses at carrier peaks of alternate polarity, and
   first pulse delay circuit which receives pulses from said pulse generator, and delays, passes and delivers them as short gating pulses to said first sampling means, substantially at instants of peaks of alternate polarity of said carrier, at said first sampling means, and
   second pulse delay circuit which receives pulses from said pulse generator, and delays, passes and delivers them as short gating pulses to said second sampling means substantially at instants of zero-crossings of said carrier at said second sampling means.

6. Reproducing apparatus in accordance with claim 5, in which said pulse generator receives the output of the carrier generator of the recording apparatus which has recorded said input wave on said input recording medium, and said carrier selector is not provided.

7. A recording and reproducing system which comprises:
   a first recording apparatus, in which a band-limited signal is passed through a double sideband amplitude modulator, supplied by a carrier generator with a carrier of substantially constant amplitude, and substantially constant frequency, and the output of said amplitude modulator, free from the signal, is recorded by recording means on a recording medium, and
   a first reproducing apparatus, which reproduces said recorded signal from said recorded medium, together with noise superimposed on said modulated carrier in the frequency band of said modulated carrier, and by sampling means timed from said carrier, and reconstruction means, delivers a carrier modulated by said signal to a load circuit.

8. A recording and reproducing system according to claim 7, in which said load circuit is substantially identical to said recording apparatus according to claim 7, and records said carrier modulated by said signal on a second recording medium, and said reproducing apparatus is a second reproducing apparatus according to claim 7, and the combination of recording apparatus and reproducing apparatus according to claim 7 is provided at least two times in tandem.

9. The method of recording and reproducing a band-limited signal, which comprises:
   producing a carrier of substantially constant amplitude and frequency, and
   double-sideband amplitude modulating said carrier by said signal, and
   recording said carrier, double-sideband amplitude modulated by said signal, on a first recording medium, and
   reproducing said modulated carrier, with superimposed noise, from said first recording medium, and
   determining the instants of zero-crossings of said carrier reproduced from said first recording medium, and
   sampling said modulated carrier and said superimposed noise, reproduced from said first recording medium, to produce a first sequence of short samples, all substantially at instants of zero-corssings of said reproduced carrier, and
   sampling said modulated carrier and said superimposed noise, reproduced from said first recording means, to produce a second sequence of short samples, all approximately at instants of peaks of said carrier, with a sampling frequency the same as the sampling frequency of said first sequence of short samples, and
   reconstructing said first sequence of said short samples, to produce a first analog replica of said reproduced superimposed noise of a first polarity, and
   reconstructing said second sequence of said short samples, to produce an analog replica of
   said modulated carrier, and a second analog replica of said superimposed noise, reproduced from said recording medium, of a second polarity, and
   combining said first analog replica of said reproduced superimposed noise, and said analog replica of said reproduced modulated carrier, and said second analog replica of said reproduced superimposed noise, to produce said analog replica of said
   reproduced modulated carrier, substantially free from said analog replica of said reproduced superimposed noise.

* * * * *